(12) United States Patent
Song

(10) Patent No.: US 10,981,309 B2
(45) Date of Patent: Apr. 20, 2021

(54) METHOD FOR MANUFACTURING MOLDED PRODUCT INCLUDING REAL WOOD

(71) Applicant: SEOYON E-HWA CO., LTD., Seoul (KR)

(72) Inventor: Su Wan Song, Gyeonggi-do (KR)

(73) Assignee: SEOYON E-HWA CO., LTD, Seoul (KR)

( * ) Notice: Subject to any disclaimer, the term of this patent is extended or adjusted under 35 U.S.C. 154(b) by 84 days.

(21) Appl. No.: 16/280,189

(22) Filed: Feb. 20, 2019

(65) Prior Publication Data

US 2019/0337204 A1   Nov. 7, 2019

(30) Foreign Application Priority Data

May 3, 2018   (KR) .................. 10-2018-0051278

(51) Int. Cl.
| | |
|---|---|
| *B29C 45/14* | (2006.01) |
| *B29C 33/68* | (2006.01) |
| *B32B 21/10* | (2006.01) |
| *B32B 27/12* | (2006.01) |
| *B32B 7/12* | (2006.01) |
| *B29K 711/14* | (2006.01) |

(52) U.S. Cl.
CPC ........ *B29C 45/14688* (2013.01); *B29C 33/68* (2013.01); *B29C 45/14065* (2013.01); *B32B 7/12* (2013.01); *B32B 21/10* (2013.01); *B32B 27/12* (2013.01); *B29C 2045/14155* (2013.01); *B29C 2045/14729* (2013.01); *B29K 2711/14* (2013.01)

(58) Field of Classification Search
CPC .............. B29C 45/14688; B29C 33/68; B29C 45/14065; B29C 2045/14155; B29C 2045/14729; B32B 7/12; B32B 21/10; B32B 27/12; B29K 2711/14

USPC ......................................... 156/242
See application file for complete search history.

(56) References Cited

U.S. PATENT DOCUMENTS

| | | | | |
|---|---|---|---|---|
| 2,050,118 A | * | 8/1936 | Pearson ................. | F16D 65/12 427/262 |
| 2004/0244871 A1 | * | 12/2004 | Chung .................... | C08L 97/02 144/364 |
| 2014/0374951 A1 | | 12/2014 | Piccin | |

FOREIGN PATENT DOCUMENTS

| | | |
|---|---|---|
| CN | 107953625 A | 4/2018 |
| DE | 19546551 | 1/1997 |
| DE | 202006002835 | 9/2006 |
| JP | S5517509 | 2/1980 |

(Continued)

OTHER PUBLICATIONS

Japan Patent Office, Office Action in corresponding Japan Patent Application No. 2019-031124 (dated Feb. 25, 2020).

(Continued)

*Primary Examiner* — Philip C Tucker
*Assistant Examiner* — Vicki Wu
(74) *Attorney, Agent, or Firm* — Fay Sharpe LLP

(57) ABSTRACT

The present disclosure relates to a method for manufacturing a molded product including real wood capable of forming a real wood layer on the surface of an injected molded product by using an IMD film provided with a real wood stacked body. According to the method, it is possible to manufacture the IMD film provided with the real wood stacked body on the release film, and to form the real wood layer on the surface of the injected molded product without breakage by using the IMD film.

21 Claims, 6 Drawing Sheets

(56) References Cited

FOREIGN PATENT DOCUMENTS

| JP | S5517509 A | * | 2/1980 | | |
|----|----|----|----|----|----|
| JP | S57129731 | | 8/1982 | | |
| JP | H08267405 | | 10/1996 | | |
| JP | 2003154605 | | 5/2003 | | |
| JP | 2003154605 A | * | 5/2003 | ....... | B29C 45/14811 |
| JP | 2008094038 | | 4/2008 | | |
| JP | 2008094038 A | * | 4/2008 | | |
| JP | 2017065168 A | | 4/2017 | | |
| KR | 201550089237 | | 8/2015 | | |
| KR | 20160030614 | | 3/2016 | | |

OTHER PUBLICATIONS

Chinese Office Action dated Dec. 2, 2020 of corresponding Chinese Patent Application No. 201910129317.8. (With English translation).

* cited by examiner

METHOD FOR MANUFACTURING MOLDED PRODUCT INCLUDING REAL WOOD

CROSS-REFERENCE TO RELATED APPLICATIONS

This application claims priority to Korean Patent Application No. 10-2018-0051278, filed on May 3, 2018, the disclosure of which is incorporated herein by reference in its entirety.

BACKGROUND OF THE DISCLOSURE

Field of the Disclosure

The present disclosure relates to a method for manufacturing a molded product including real wood, and more particularly, to a method for manufacturing a molded product including real wood, which may form a real wood layer on the surface of an injected molded product by using an In Mold Decoration Film (IMD Film) provided with a real wood stacked body.

Description of the Related Art

Conventional surface treatment methods of automotive interior and exterior materials include paint painting, metal plating, water pressure transfer, film insert molding, press molding using natural real wood, and the like.

Among the surface treatment methods, paint painting, metal plating, water pressure transfer, or the like causes environmental pollution in the manufacturing process, and continuously generates organic compounds due to an influence of the used materials and method even in a finished product, such that it is a trend that their positions are becoming narrower due to the environmental regulations that are currently underway.

Meanwhile, Korean Patent Laid-Open Publication No. 10-2016-0030614 (hereinafter referred to as 'Patent Document 1') discloses a method for manufacturing an expensive real wood molded product capable of providing aesthetic sense and luxuriousness.

The method for manufacturing the real wood molded product disclosed in Patent Document 1 includes a material preparing step of preparing real wood veneer, a press step of pressing real wood to mold it in a shape of a molded product, a rear injection step of forming a base layer on the lower surface of the real wood formed in the shape of the molded product by injection, a coloring step of deciding and coloring a color on the upper surface of the rear-injected real wood, a coating step of forming a surface layer by coating the colored surface of the real wood, a milling step of cutting the end portion of the coated real wood into a desired shape, and a polishing step of polishing the surface layer of the milled real wood product.

The manufacturing method disclosed in Patent Document 1 has very complicated process, has a high failure rate, is very expensive compared to other surface treatment methods, and is applied only to some advanced vehicles.

For this reason, as disclosed in Korean Patent Laid-Open Publication No. 10-2015-0089237 (hereinafter referred to as 'Patent Document 2'), although efforts have been made to manufacture it by using a film, which may be used for a method for reducing a structure layer of a real film, an insert molding method having a relatively simple process and a low manufacturing cost, or the like, it has been difficult to use it because molding did not work well and chronic fracture occurs due to low tensile strength and bending strength that are inherent properties of real wood that is a natural material.

In particular, there occurs a problem in that in case of manufacturing by using the insert molding method disclosed in Patent Document 2, a direct force is applied to the real wood film in the wood press step of pre-heating and then pre-forming the real wood film to make a shape, and at this time, stress, which may not withstand, is concentrated on the edge portion of the curved and deformed real wood film, thereby continuously occurring the phenomenon such as breakage and greatly reducing the surface quality thereof. Due to such a problem, it is difficult to apply it to mass production as a product.

SUMMARY OF THE DISCLOSURE

The present disclosure is intended to solve the above problem, and an object of the present disclosure is to provide a method for manufacturing a molded product including real wood, which may manufacture an IMD film provided with real wood stacked body on a release film, and may form a real wood layer on the surface of an injected molded product without breakage by using the IMD film.

For achieving the object, a method for manufacturing a molded product including real wood according to a preferred embodiment of the present disclosure includes preparing an IMD film of preparing an IMD film provided with a real wood stacked body on a release film; supplying the IMD film of supplying the IMD film so that the real wood stacked body is disposed at an injecting point; fixing the IMD film of deforming and closely contacting the real wood stacked body corresponding to the shape a cavity by closely contacting the IMD film to the cavity of a lower mold through vacuum absorption; forming an injecting layer of forming an injecting layer by coupling an upper mold and the lower mold, and curing it after injecting melted injecting material into the cavity through the upper mold; and ejecting the molded product of ejecting the molded product in which the release film has been separated from the real wood stacked body by separating the lower mold and the upper mold.

The preparing the IMD film may include forming the real wood layer of forming the real wood layer in a thin film shape having a predetermined thickness by cutting natural wood; forming a fiber layer of attaching a fiber layer on the lower surface of the real wood layer; pre-processing of pre-processing the real wood stacked body having the fiber layer stacked on the real wood layer in order to prevent discoloration of the real wood layer; and manufacturing the IMD film of manufacturing the IMD film by attaching a plurality of pre-processed real wood stacked body to the release film to be spaced at a certain interval apart from each other, and attaching the real wood layer to the release film.

Herein, the forming the real wood layer may manufacture the real wood layer by cutting it into a thin film of 0.1 mm or more and 1.0 mm or less in thickness.

Then, the forming the fiber layer may also attach the fiber layer to the real wood layer by using adhesive agent, or also attach it by using a thermal compression bonding method.

In addition, the pre-processing may also include decolorizing of decolorizing the real wood stacked body by using decolorizing agent; washing of washing the real wood stacked body having completed decolorization; and drying of drying the washed real wood stacked body.

Herein, the decolorizing may also decolorize it by using decolorizing agent prepared with a hydrogen peroxide dilution solution or a hydrogen peroxide dilution solution to which ammonia is added.

Then, the hydrogen peroxide dilution solution may also be prepared by mixing pure water and hydrogen peroxide at 8:2 to 5:5 wt %.

In addition, the hydrogen peroxide dilution solution to which ammonia is added may also be prepared by mixing the hydrogen peroxide dilution solution prepared by mixing pure water and hydrogen peroxide at 8:2 to 5:5 wt % with ammonia at 5 to 20 wt % of hydrogen peroxide.

The release film is prepared by any one of PET, PE, PP, and CPP films, and the thickness thereof is prepared at 0.1 mm or more and 1.0 mm or less.

The manufacturing the IMD film may also manufacture the IMD film in the form of a roll in order to continuously supply the real wood stacked body to the lower mold.

The method for manufacturing the molded product according to an embodiment of the present disclosure may further include forming a coating layer of forming a coating layer for covering the real wood layer in order to protect the real wood layer.

Herein, the forming the coating layer may form the coating layer by attaching a resin in the form of a film to the real wood layer after the pre-processing, or may form the coating layer by applying a resin in a liquid state to the real wood layer.

Alternatively, the forming the coating layer may form the coating layer on the real wood layer by using an insert injection molding after disposing the molded product in a mold after the ejecting the molded product, or may form the coating layer by applying a resin in a liquid state to the real wood layer of the molded product.

The fixing the IMD film may also include fixing the position of the IMD film of closely contacting the portion of the release film of the IMD film disposed at the upside of the lower mold to the upside surface of the lower mold by operating a close contact part provided at the outside of the cavity in the lower mold; and vacuum-absorbing of closely contacting the portion provided with the real wood stacked body in the IMD film to the inside surface of the cavity by performing vacuum exhaust through a suction hole formed in the lower mold.

Then, since the adhesive force between the upper mold and the injecting layer is stronger than the adhesive force between the real wood stacked body and the release film, the ejecting the molded product may eject it after separating the release film from the real wood stacked body when the upper mold is separated from the lower mold, and detaching the molded product attached to the upper mold to move together.

According to the method for manufacturing the molded product including the real wood according to the present disclosure, it is possible to manufacture the IMD film provided with the real wood stacked body on the release film, and to form the real wood layer on the surface of the injected molded product without breakage by using the IMD film.

Then, according to the present disclosure, it is possible to prepare the IMD film, which attaches a plurality of real wood stacked body to be spaced at a certain interval apart from each other, on the release film in the form of a roll to continuously supply the real wood stacked body on the lower mold, thereby manufacturing the molded product continuously.

DESCRIPTION OF SPECIFIC EMBODIMENTS

Figure 1:
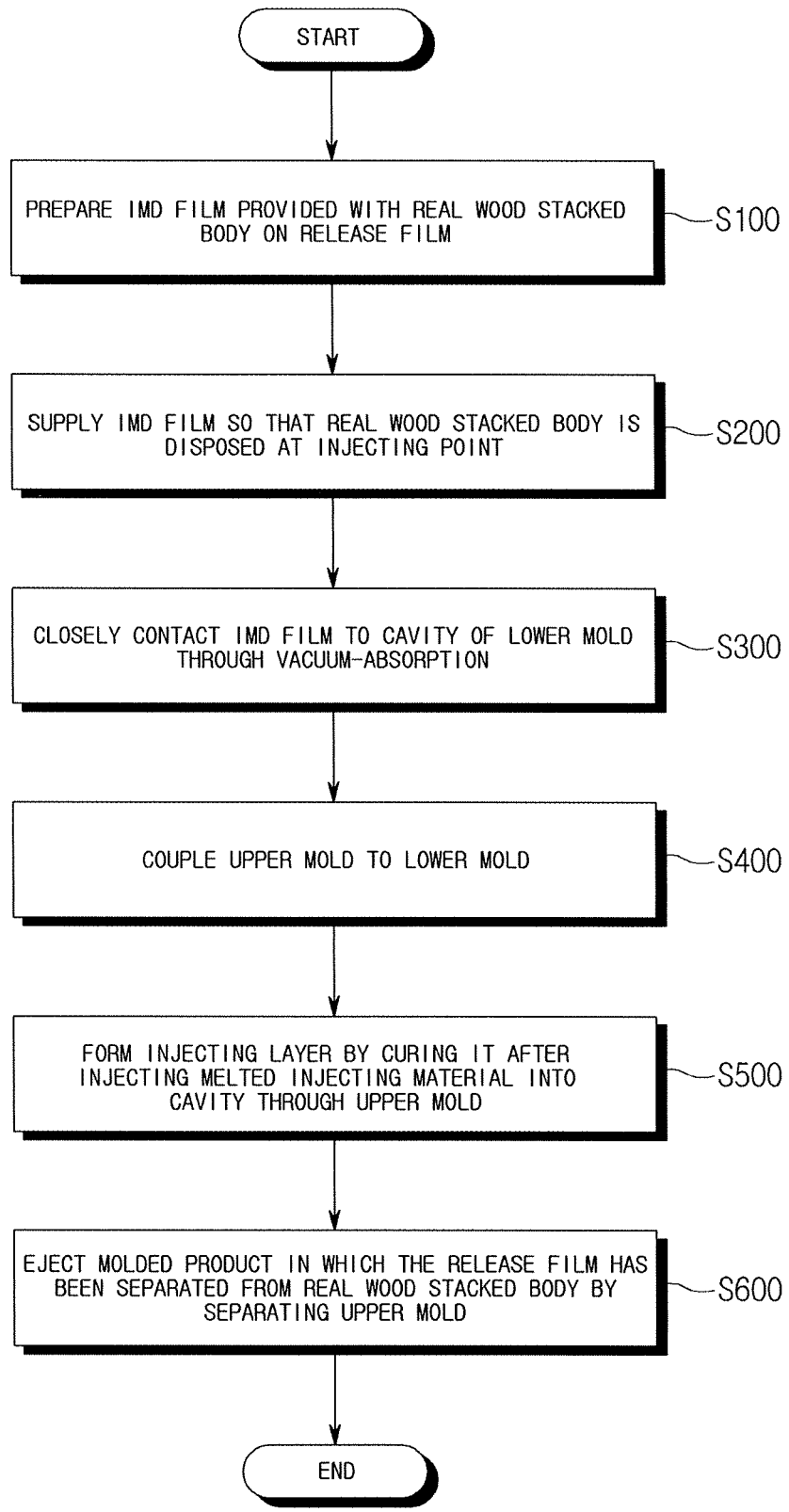
FIG. 1 is a flowchart schematically illustrating a method for manufacturing a molded product including real wood according to an embodiment of the present disclosure.

In order to facilitate understanding of the features of the present disclosure, a method for manufacturing a molded product including real wood according to an embodiment of the present disclosure will be described in more detail below.

It should be noted that, in order to facilitate understanding of the embodiments described below, in denoting the reference numerals to the components in each accompanying drawing, the same components are denoted by the same reference numerals as possible even though they are illustrated in different drawings. In addition, in the description of the present disclosure, a specific description of related known configurations or functions will be omitted when it is determined to obscure the subject matter of the present disclosure.

Hereinafter, a specific embodiment of the present disclosure will be described with reference to the accompanying drawings.

Figure 2:
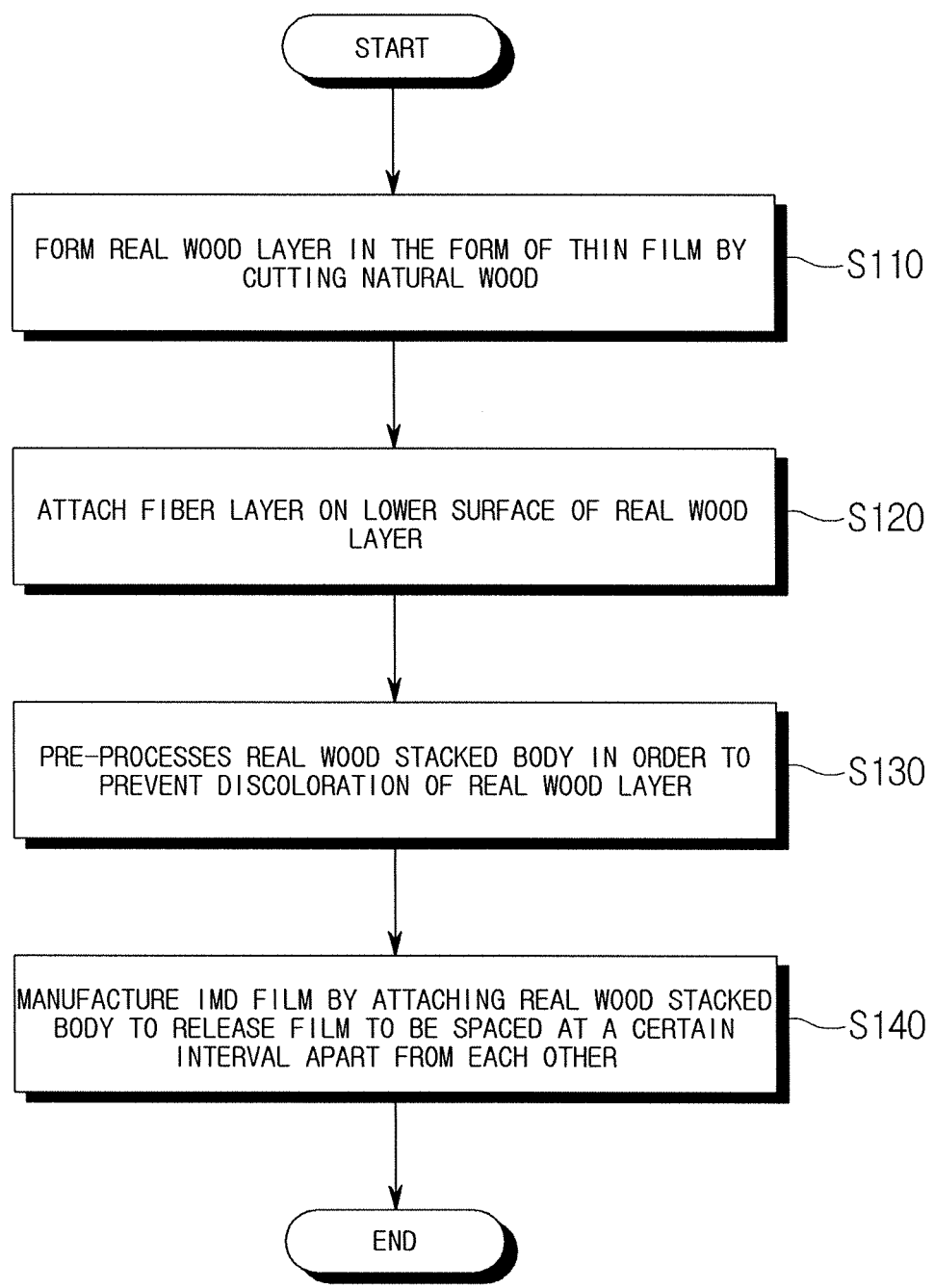
FIG. 2 is a flowchart schematically illustrating preparing an IMD film in the method for manufacturing the molded product including the real wood according to an embodiment of the present disclosure.
Figure 3:
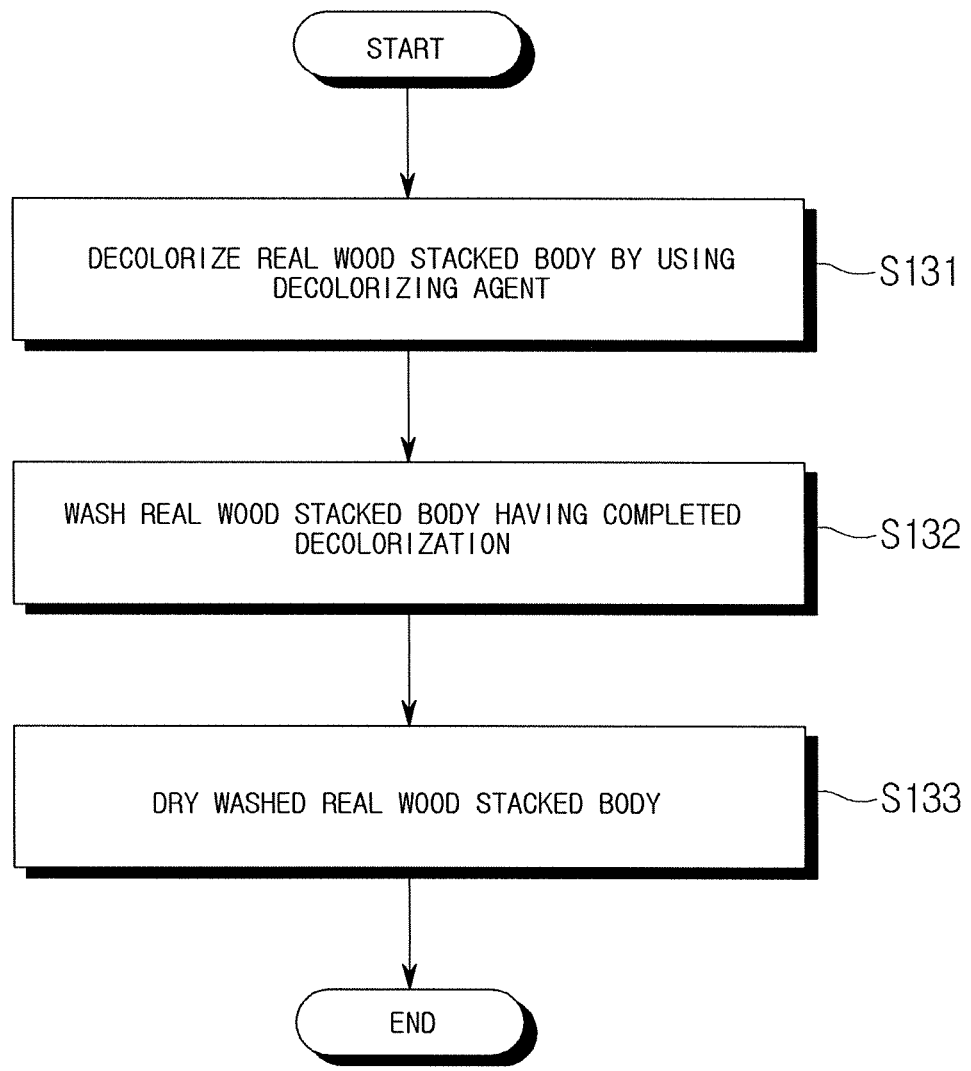
FIG. 3 is a flowchart schematically illustrating pre-processing of the preparing the IMD film in the method for manufacturing the molded product including the real wood according to an embodiment of the present disclosure.

FIG. 1 is a flowchart schematically illustrating a method for manufacturing a molded product including real wood according to an embodiment of the present disclosure, FIG. 2 is a flowchart schematically illustrating preparing an IMD film in the method for manufacturing the molded product, and FIG. 3 is a flowchart schematically illustrating pre-processing in the preparing the IMD film.

Figure 4:
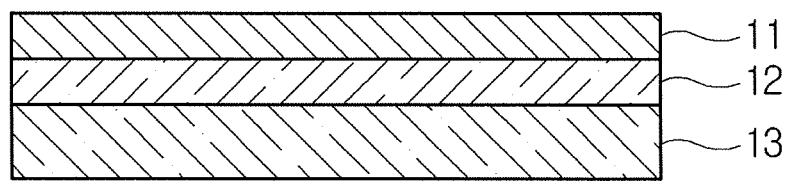
FIG. 4 is a diagram schematically illustrating a real wood stacked body manufactured through the preparing the IMD film in the method for manufacturing the molded product including the real wood according to an embodiment of the present disclosure.
Figure 5:
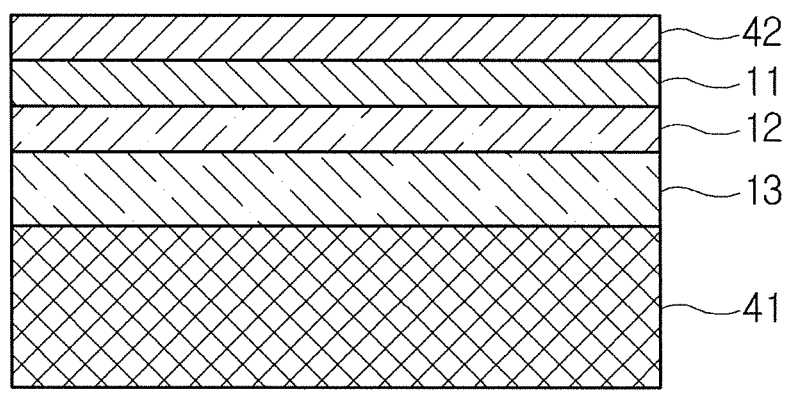
FIG. 5 is a diagram schematically illustrating the molded product manufactured through the method for manufacturing the molded product including the real wood according to an embodiment of the present disclosure.

Then, FIG. 4 is a diagram schematically illustrating a real wood stacked body manufactured through the preparing the IMD film, and FIG. 5 is a diagram schematically illustrating the molded product manufactured through the method for manufacturing the molded product.

Figure 6:
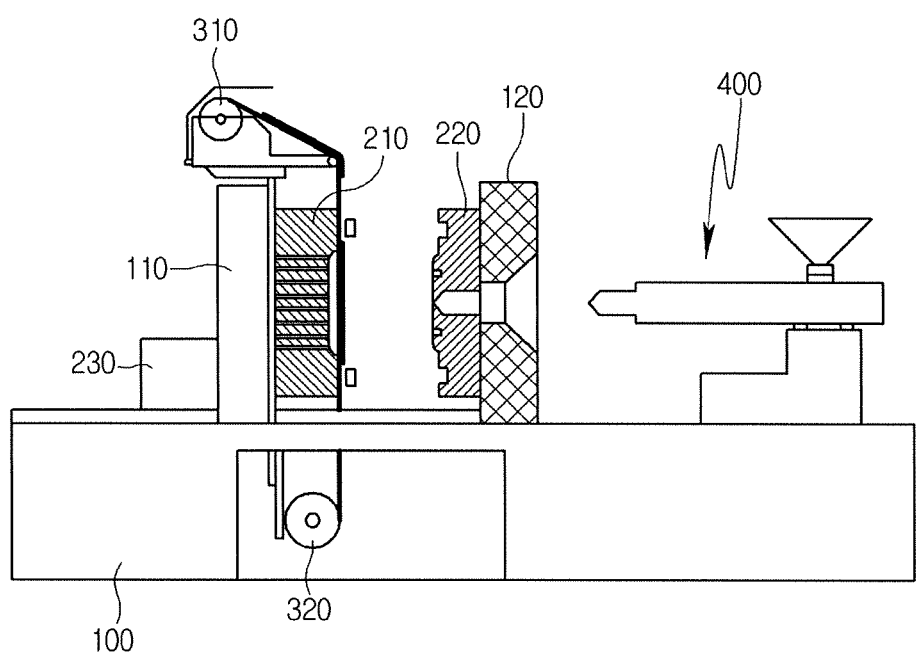
FIG. 6 is a diagram schematically illustrating a molding device used in the method for manufacturing the molded product including the real wood according to an embodiment of the present disclosure.
Figure 7:
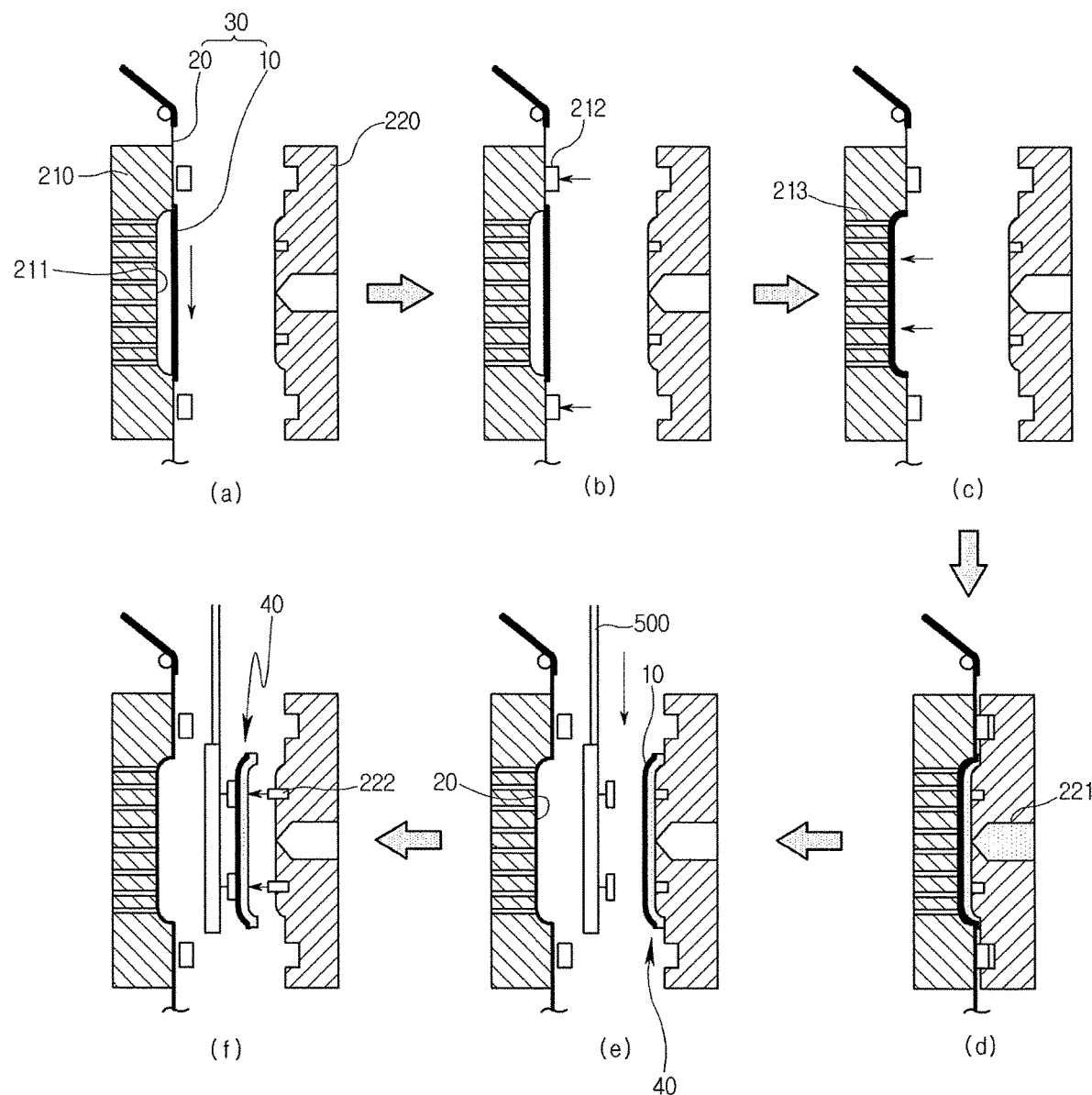
FIG. 7 is a diagram illustrating an order in which the molded product is manufactured through the molding device used in the method for manufacturing the molded product including the real wood according to an embodiment of the present disclosure.

In addition, FIG. 6 is a diagram schematically illustrating a molding device used in the method for manufacturing the molded product, and FIG. 7 is a diagram illustrating an order in which the molded product is manufactured through the molding device.

Referring to FIGS. 1 to 7, a method for manufacturing a molded product including real wood includes preparing an IMD film of preparing an IMD film 30 provided with a real wood stacked body 10 on a release film 20 S100, supplying the IMD film of supplying the IMD film 30 so that the real wood stacked body 10 is disposed at an injecting point S200, fixing the IMD film of deforming and closely contacting the real wood stacked body 10 corresponding to the shape of a cavity 211 by closely contacting the IMD film 30 to the cavity 211 of a lower mold 210 through vacuum adsorption S300, forming an injecting layer of forming an injecting layer by coupling an upper mold 220 to the lower mold 210 S400, and curing it after injecting a melted injecting material into the cavity 211 through the upper mold 220 S500, and ejecting a molded product of ejecting a molded product 40 in which the release film 20 has been separated from the real wood stacked body 10 by separating the upper mold 220 from the lower mold 210 S600.

That is, the method for manufacturing the molded product of the present disclosure may manufacture a molded product by using an in-mold molding method for producing the IMD film 30 attaching the real wood stacked body 10 to the release film 20, and injecting it after disposing the IMD film 30 to the mold, thereby preventing the real wood layer 11 from being broken.

Referring to FIG. 2, the preparing the IMD film S100 includes forming the real wood layer of forming the real wood layer 11 of a thin film shape having a predetermined thickness by cutting natural wood S110, forming a fiber layer of attaching a fiber layer 13 to the lower surface of the real wood layer 11 S120, pre-processing of pre-processing the real wood stacked body 10 having the fiber layer 13 stacked on the real wood layer 11 in order to prevent discoloration of the real wood layer 11 S130, and manufacturing the IMD film of manufacturing the IMD film 30 by attaching a plurality of pre-processed real wood stacked body 10 to the release film 20 to be spaced at a certain interval apart from each other and attaching the real wood layer 11 to the release film 20 S140.

More specifically, the forming the real wood layer S110 preferably manufactures it by cutting the real wood layer 11 into a thin film having 0.1 mm or more and 1.0 mm or less in thickness. This is because when the thickness of the real wood layer 11 is smaller than 0.1 mm, the physical property of the real wood layer 11 is largely reduced and thereby, the abrasion resistance for the subsequent manufacturing steps becomes insufficient, and when the thickness thereof exceeds 1.0 mm, formability is reduced and the impregnation of the decolorizing agent into the real wood layer 11 becomes difficult in the pre-processing S130, which will be described later, thereby reducing the decolorizing effect.

The forming the fiber layer S120 preferably attaches the fiber layer 13 to the real wood layer 11 by using adhesive agent, or attaches it by using a thermal compression bonding method. That is, as illustrated in FIG. 4, the fiber layer 13 is adhered to the real wood layer 11 through an adhesive layer 12. The forming the fiber layer S120 is a step of forming a kind of a reinforcing layer for reinforcing the strength of the real wood layer 11.

Firstly, the adhesive layer 12 may preferably use a Thermoplastic Poly Urethane (TPU) film in terms of cost efficiency but is not limited thereto, and may use a general-purpose resin film such as polyethylene (PE), polypropylene (PP), thermoplastic poly urethane (TPU), ethylene-vinyl acetate copolymer (EVA), polyether sulfone (PES), polyacetal (PA), and the like called as a hot-melt film, and may also use a general adhesive film showing an adhesive force even at room temperature. In addition, it is natural that thermosetting resins such as an epoxy resin, a melamine resin, and a polyurethane resin may also be used when strong thermal stability and adhesion are required.

The thickness of the adhesive layer 12 is preferably 0.1 mm or more and 1.0 mm or less considering the formability of the real wood stacked body 10 in the following steps.

Then, the fiber layer 13 is for providing a certain strength to the real wood layer 11, and the material and the shape thereof are not limited, but preferably, may apply it by constituting fiber such as polyethylene terephthalate (PET), nylon, acrylic, cotton, or polyurethane in the form of woven fabric or nonwoven fabric.

The fiber layer 13 configured in the form of woven fabric or nonwoven fabric may be attached to the real wood layer 11 by using a thermal compression bonding method through the adhesive layer 12. For example, it may be attached by using a roll press method using a roll press device that is one of the known thermal compression bonding methods.

The thickness of the fiber layer 13 is preferably 0.1 mm or more and 1.0 mm or less considering the formability of the real wood stacked body 10 in the following steps.

The pre-processing S130 is a step of pre-processing the real wood stacked body 10 having the fiber layer 13 stacked on the real wood layer 11 in the forming the fiber layer S120 in order to prevent discoloration of the real wood layer 11.

More specifically, referring to FIG. 3, the pre-processing S130 includes decolorizing of decolorizing the real wood stacked body 10 having the adhesive layer 12 and the fiber layer 13 stacked on the real wood layer 11 by using decolorizing agent S131, washing of washing the real wood stacked body 10 having completed decolorization S132, and drying of drying the washed real wood stacked body 10 S133.

The decolorizing S131 may be performed by placing the real wood stacked body in a decolorizing vessel, pouring decolorizing agent therein, and then stirring it.

Herein, the decolorizing agent may be applied without limitation as long as it may decolorize the real wood layer into an intended color, but is preferably hydrogen peroxide dilution solution or hydrogen peroxide dilution solution to which ammonia is added considering productivity and manufacturing cost.

When hydrogen peroxide dilution solution is used as the decolorizing agent, the hydrogen peroxide dilution solution is preferably prepared by mixing pure water with hydrogen peroxide at a weight percent ratio of 80:20 to 50:50. This is because it is not possible to achieve the intended decolorizing effect when the hydrogen peroxide is mixed at smaller than 20 wt %, and it is possible to cause excess decolorization and damage of the real wood layer when the hydrogen peroxide is mixed at more than 50 wt %.

Alternatively, when the hydrogen peroxide dilution solution to which ammonia is added is used as the decolorizing agent, the hydrogen peroxide dilution solution to which ammonia is added may be prepared by forming the hydrogen peroxide dilution solution by mixing pure water with hydrogen peroxide at a weight percent ratio of 80:20 to 50:50, and then adding ammonia so that the ammonia constitutes 5 to 20 wt % of the hydrogen peroxide dilution solution.

The decolorizing S131 may decolorize the real wood stacked body unlike the conventional known method of decolorizing only the real wood layer alone, thereby remarkably reducing occurrence of breakage or wrinkling of the real wood layer.

The washing S132 is a step of removing the decolorizing agent impregnated into the real wood stacked body through the decolorizing S131, and may be achieved by performing a procedure of pouring and stirring the real wood stacked body decolorized through the decolorizing agent into pure water in a certain vessel during a predetermined time at about 1 to 5 times.

At this time, in order to additionally neutralize the decolorizing agent, a predetermined neutralizing agent capable of neutralizing the decolorizing agent during the washing S132 or before the washing S132 may also be applied to the real wood stacked body.

The drying S133 is a step of removing moisture included in the real wood stacked body in order to perform the following steps for the washed real wood stacked body.

At this time, in the drying SI33, in order to prevent damage of the real wood stacked body and to save a manufacturing time, the drying temperature may be limited to a predetermined temperature range, preferably, 10° C. or more and 50° C. or less, and the drying time may be limited to a predetermined time range, preferably, 1 hour or more and 100 hours or less.

The reason for limiting the range of the drying temperature to 10° C. or more and 50° C. or less is because it is possible to lengthen the drying time, thereby reducing efficiency when the drying temperature is smaller than 10° C., and to occur the phenomenon of reducing surface quality such as occurrence of wrinkles on a surface due to quick drying of the real wood stacked body when the drying temperature exceeds 50° C.

Meanwhile, although not illustrated in the drawing, coloring the decolorized real wood layer into an intended color by using pigments and dyes may also be performed additionally.

For improving light resistance, the manufacturing the IMD film S140 attaches the real wood stacked body 10 having completed the pre-processing S130 to the release film 20 prepared in the form of a roll to be spaced at a certain interval apart from each other in order to be applied to the following in-mold process.

Herein, the release film 20 preferably uses a PET film, but is not limited thereto. That is, the release film 20 may use general-purpose resin films such as PE, PP, Casting polypropylene (CPP), TPU, EVA, PES, and PA.

Then, the thickness of the release film 20 is preferably prepared to be 0.1 mm or more and 1.0 mm or less considering economy and formality of the real wood film in the in-mold mold later.

In addition, the release film 20 is separated and removed from the real wood layer 11 in the ejecting the molded product S600. At this time, release agent may also be applied to one surface of the release film 20 facing the real wood layer 11 in order to be easily peeled off from the real wood layer 11. Herein, the release agent may use a silicone-based resin, an acrylic-based resin, or a fluorine-based resin, or the like.

The IMD film 30 manufactured through the preparing the IMD film S100 is preferably prepared in the form of a roll in order to continuously manufacture the molded product 40 by continuously supplying the real wood stacked body 10 to the lower mold 210.

The IMD film 30 thus manufactured is used to manufacture the molded product through the in-mold molding device. The in-mold molding device used herein has been schematically illustrated in FIGS. 6 and 7.

Referring to FIGS. 6 and 7, the in-mold molding device includes a base frame 100, a moving frame 110 disposed on the upper portion of the base frame 100 to be prepared to move in the front-and-rear direction, fastened with the lower mold 210, and provided with an IMD film supply roller 310 and an IMD film recovery roller 320, a fixing frame 120 fixedly disposed to the upper portion of the base frame 100 and fastened with the upper mold 220, a vacuum pump 230 provided in the fixing frame 120 and for generating vacuum in order to vacuum-absorb the IMD film to a cavity 211 of the lower mold 210, an injecting means 400 disposed at the rear end of the fixing frame 120 and for injecting a melted injecting material into the cavity 211 of the lower mold 210 through the upper mold 220 by penetrating the fixing frame 120, and an ejecting part 500 for ejecting the molded product by completing molding.

A close contact part 212 is provided on the upside surface of the lower mold 210 to closely contact the portion of the release film 20 of the IMD film 30 disposed at the upside of the lower mold 210 to the upside surface of the lower mold 210.

Then, a plurality of suction holes 213 for connecting between the cavity 211 and the vacuum pump 230 may be formed in the lower mold 210 to suck air of the cavity 211 to absorb the IMD film to the cavity 211. That is, when the vacuum pump 230 is operated after the close contact part 212 closely contacts the portion of the release film 20 in the IMD film 30 to the upside surface of the lower mold 210, the air in the space formed by the cavity 211 and the IMD film 30 may be sucked and discharged to closely contact the IMD film 30 to the cavity 211.

The upper mold 220 is penetrated and formed with an inserting hole 221 for inserting the injecting means 400 in order to inject the melted injecting material into the cavity 211 of the lower mold 210 after being coupled with the lower mold 210.

Then, the upper mold 220 is provided with a pressurizing part 222 for detaching the molded product 40 attached to the upper mold 220 after the molding process is completed.

That is, since the adhesive force between the upper mold 220 and the injecting layer 41 formed by curing the injecting material is stronger than the adhesive force between the real wood stacked body 10 and the release film 20, the release film 20 is separated from the real wood stacked body 10 when the upper mold 220 is separated from the lower mold 210, and the molded product 40 is attached to the upper mold 220 to move together.

Thereafter, the ejecting part 500 is disposed at the lower side of the upper mold 220 to receive and move to the outside the molded product 40 detached from the upper mold 220. Herein, a vacuum suction part (not illustrated) is provided in the ejecting part 500 to vacuum-absorb and fix the molded product 40 before the molded product 40 is separated from the upper mold 220, and then when the molded product 40 is detached from the upper mold 220, it may be prepared to move to the outside. In this case, it is possible to prevent the molded product from falling.

The manufacturing the molded product by using the above-described in-mold molding device will be described with reference to FIG. 7.

As in FIG. 7(A), the IMD film 30 is disposed at the upside of the lower mold 210 and then the real wood stacked body 10 is supplied to be disposed at the injecting point, that is, at the upside of the cavity 211 of the lower mold 210; as in FIG. 7(B), the close contact part 212 provided in the lower mold 210 is operated to closely contact the portion of the release film 20 of the IMD film 30 disposed at the upside of the lower mold 210 to the upside surface of the lower mold 210; as in FIG. 7(C), the vacuum pump 230 is operated to perform vacuum-exhaust through the suction hole 213 formed on the lower mold 210 to closely contact the portion provided with the real wood stacked body 10 in the IMD film 30 to the inside surface of the cavity 211; as in FIG. 7(D), the ejecting means 400 is operated after coupling the lower mold 210 and the upper mold 220 to form the injecting layer by curing it after injecting the melted injecting material in the cavity of the lower mold 210; as in FIG. 7(E), when the upper mold 220 and the lower mold 210 are separated from each other, the molded product 40 is attached to the upper mold 220 and at this time, the ejecting part 500 is disposed at one side of the molded product 40; and as in FIG. 7(F), the pressurizing part 222 of the upper mold 220 is operated to detach the molded product 40 from the upper mold 220 to seat the molded product 40 in the ejecting part 500, and then the molded product 40 may be manufactured by moving it the outside.

Of course, the form of the in-mold manufacturing device is not limited thereto, and may also be prepared in any form capable of manufacturing the molded product 40 by using the in-mold molding method using the IMD film 30.

As described above, in the case that the molded product is manufactured by attaching the real wood layer to the release film and then forming the injecting layer through the in-mold molding device, since the real wood layer has been attached to the release film when the IMD film is deformed by closely contacting with the cavity of the lower mold, it is possible to prevent the real wood layer from being broken by the release film, thereby manufacturing the molded product having excellent surface quality.

In addition, the method for manufacturing the molded product of the present disclosure may further include forming a coating layer of forming a coating layer 42 for covering the real wood layer 11 in order to protect the real wood layer 11. That is, in order to protect the real wood layer 11 exposed to the outside, the forming the coating layer is a step of forming the coating layer 42 as a protective layer for covering the surface of the real wood layer 11, as illustrated in FIG. 5.

Herein, the coating layer 42 may be formed of a thermoplastic or thermosetting resin such as a polycarbonate (PC) resin, a polyurethane (PU) resin, an epoxy resin, an ABS resin, a polypropylene (PP) resin, and a polyacetal (PA) resin.

As described above, the forming the coating layer may form the coating layer 42 by attaching a resin in the form of a film to the real wood layer 11 after the pre-processing S130 in the preparing the IMD film S100, or form the coating layer 42 by applying a resin in a liquid state on the real wood layer 11.

In this case, when a resin material is prepared in the form of a film for forming the coating layer 42, the coating layer 42 may be attached to the real wood layer 11 by using adhesive agent or a thermal compression bonding method, and when the resin material is prepared in a liquid state, the coating layer 42 may be coated thereon by spraying it on the real wood layer 11 by using a spray method.

Alternatively, the forming the coating layer may form the coating layer 42 on the real wood layer 11 by using an insert injecting molding after disposing the molded product 40 in the mold after the ejecting the molded product S600, or may also form the coating layer 42 by applying a resin in a liquid state on the real wood layer 11 of the molded product 40.

As described above, the coating layer 42 may be formed on the real wood layer 11 in the manufacturing the IMD film or may also be formed on the real wood layer 11 after the molded product 40 is manufactured, but it is advantageous for the completeness of the coating layer 42 to form it on the real wood layer 11 after the molded product 40 is manufactured.

In addition, the forming the coating layer may also be implemented by a method for forming a color layer (not illustrated) for coloring the surface of the real wood layer 11, and then forming a transparent clear layer (not illustrated) for reinforcing the physical property for the surface of the color layer.

As described above, although the present disclosure has been described with reference to the limited embodiments and drawings, it will be apparent that the present disclosure is not limited thereto, and various modifications and deformations may be made by those skilled in the art to which the present disclosure pertains within the technical spirit of the present disclosure and the equivalent scope of the appended claims thereof.

What is claimed is:

1. A method for manufacturing a molded product comprising:
    preparing an in-mold decoration film provided with a real wood stacked body on a release film, said real wood stacked body including a real wood layer and one or more of an adhesive layer and a fiber layer;
    supplying the in-mold decoration film so that the real wood stacked body is disposed at an injecting point;
    fixing the in-mold decoration film by deforming and reshaping the real wood stacked body to correspond to the shape of a mold cavity of a lower mold and contacting the in-mold decoration film to the mold cavity of the lower mold through vacuum absorption;
    forming an injecting layer by coupling an upper mold and the lower mold, and injecting a melted injecting material into the mold cavity of the lower mold through the upper mold and then curing the injecting material; and
    ejecting a molded product in which the release film has been separated from the real wood stacked body by separating the lower mold and the upper mold,
    wherein preparing the in-mold decoration film comprises:
        forming the real wood layer in the form of a thin film having a predetermined thickness by cutting natural wood;
        attaching the fiber layer on the lower surface of the real wood layer;
        pre-processing the real wood stacked body having the fiber layer stacked thereon in order to prevent discoloration of the real wood layer; and
        manufacturing the in-mold decoration film by attaching a plurality of pre-processed real wood stacked bodies to the release film to be spaced at a certain interval apart from each other, and attaching the real wood layer of each of the stacked bodies to the release film.

2. The method for manufacturing the molded product of claim 1, wherein the forming of the real wood layer comprises cutting the real wood layer into a thin film having a thickness of 0.1 mm to 1.0 mm.

3. The method for manufacturing the molded product of claim 1, wherein the fiber layer is attached to the real wood layer by using the adhesive layer, or by using a thermal compression bonding method.

4. The method for manufacturing the molded product of claim 1, wherein the pre-processing comprises:

decolorizing the real wood stacked body by using decolorizing agent;

washing the real wood stacked body upon having completed decolorization; and drying the washed real wood stacked body.

5. The method for manufacturing the molded product of claim 4, wherein the decolorizing is accomplished by using the decolorizing agent prepared with a hydrogen peroxide dilution solution to which no ammonia is added, or the hydrogen peroxide dilution solution to which ammonia is added.

6. The method for manufacturing the molded product of claim 5, wherein the hydrogen peroxide dilution solution is prepared by mixing pure water and hydrogen peroxide at a weight percent ratio of 80:20 to 50:50.

7. The method for manufacturing the molded product of claim 5, wherein the hydrogen peroxide dilution solution is prepared by mixing pure water and hydrogen peroxide at a weight percent ratio of 80:20 to 50:50 and then adding ammonia such that the ammonia constitutes 5 to 20 wt. % of the hydrogen peroxide dilution solution.

8. The method for manufacturing the molded product of claim 1, wherein the release film is prepared from any one of polyethylene terephthalate, polyethylene, polypropylene, and cast polypropylene, and a thickness the film is 0.1 mm to 1.0 mm.

9. The method for manufacturing the molded product of claim 1, wherein the in-mold decoration film is supplied in the form of a roll in order to continuously supply the real wood stacked body to the lower mold.

10. The method for manufacturing the molded product of claim 1, wherein said method further comprises forming a coating layer for covering the real wood layer in order to protect the real wood layer.

11. The method for manufacturing the molded product of claim 10, wherein the coating layer is formed by attaching a resin in the form of a film to the real wood layer after the pre-processing, or the coating layer is formed by applying a resin in a liquid state to the real wood layer.

12. The method for manufacturing the molded product of claim 10, wherein the coating layer is formed on the real wood layer by using an insert injecting molding after disposing the molded product in the lower mold after the ejection of the molded product, or the coating layer is formed by applying a resin in a liquid state to the real wood layer of the molded product.

13. The method for manufacturing the molded product of claim 1, wherein the fixing of the in-mold decoration film comprises:

fixing the position of the in-mold decoration film by contacting the portion of the release film whereon the in-mold decoration film is disposed to the upside surface of the lower mold, by operating a close contact part provided at the outside of a mold cavity in the lower mold; and vacuum-absorbing the portion of the release film provided with the real wood stacked body comprising the in-mold decoration film to the inside surface of the mold cavity by performing vacuum exhaust through a suction hole formed in the lower mold.

14. The method for manufacturing the molded product of claim 1, wherein the molded product is ejected after separating the release film from the real wood stacked body when the upper mold is separated from the lower mold, wherein the adhesive force between the upper mold and the injecting layer is stronger than the adhesive force between the real wood stacked body and the release firm, so that the molded product is detached from the release film.

15. A method for manufacturing a molded product comprising:

providing a real wood stacked body, said real wood stacked body including a real wood layer and a fiber layer adhesively connected to a bottom surface of said real wood layer, said real wood layer having a thickness of 0.1-1 mm, said fiber layer including a woven fabric or non-woven fabric, said fiber layer having a thickness of 0.1-1 mm;

providing a release film, said release film having a thickness of 0.1-1 mm, said release film including one or more materials selected from the group consisting of polyethylene terephthalate, polyethylene, polypropylene, casting polypropylene, thermoplastic polyurethane, ethylene-vinyl acetate, polyethersulfone, and polyamide;

applying said release film to a) a top surface of said real wood layer or b) a top surface of a coating layer, said coating layer applied to said top surface of said real wood layer, said coating layer including one or more materials selected from the group consisting of polycarbonate resin, polyurethane resin, epoxy resin, acrylonitrile butadiene styrene resin, polypropylene resin, and polyacetal resin;

providing a molding machine, said molding machine including a top and bottom mold portion, said bottom mold portion including a bottom mold cavity, said bottom mold cavity including a plurality of vacuum passages connected to a bottom surface of said bottom mold cavity;

positioning said release film and said real wood stacked body over said bottom mold cavity, said release film positioned between said bottom mold cavity and said real wood stacked body;

deforming and reshaping said real wood stacked body by causing said real wood stacked body to be moved into said bottom mold cavity, said step of deforming including applying a vacuum to said plurality of vacuum passages causing said real wood stacked body to be drawn into said bottom mold cavity;

forming an injecting layer on a bottom surface of said real wood stacked body to form said molded product, said step of forming said injecting layer includes a) causing said top and bottom mold portions to move toward one another, b) injecting said injecting layer though said top mold to form said injecting layer on said bottom surface of said real wood stacked body, c) allowing said injecting layer to at least partially cure, and d) moving said top mold portion away from said bottom mold portion after said injecting layer has at least partially cured; and, removing said molded product from said molding machine.

16. The method as defined in claim 15, said method further includes the step of decolorizing said real wood stacked body prior to said step of molding, said step of decolorizing said real wood stacked body including a) providing a decolorizing agent, b) applying said decoloring agent to said real wood stacked body, c) at least partially removing said decolorizing agent from said real wood stacked body, and d) drying said real wood stacked body after said step of removing said decolorizing agent from said real wood stacked body; said decolorizing agent including a hydrogen peroxide solution or a hydrogen peroxide and ammonia solution.

17. The method as defined in claim 16, wherein said hydrogen peroxide solution includes a weight percent ratio of 80:20 to 50:50 of water and hydrogen peroxide, said hydrogen peroxide and ammonia solution including hydrogen peroxide, water and 5-20 wt. % ammonia.

18. The method as defined in claim 17, wherein said method further includes the step of applying a neutralizing agent to said real wood stacked body to neutralize said decolorizing agent on said real wood stacked body, said step of applying said neutralizing agent occurring prior to said step of drying said real wood stacked body.

19. The method as defined in claim 17, wherein said step of drying occurs at a temperature of 10-50° C. for 1-100 hours.

20. The method as defined in claim 15, wherein said method further includes the step of positioning a plurality of said real wood stacked bodies on a strip of said release film and moving said strip of said release film over a top of said bottom mold cavity until one of said real wood stacked bodies in positioned over said bottom mold cavity, said plurality of said real wood stacked bodies spaced from one another on said release film.

21. The method as defined in claim 15, wherein said step of removing said molded product from said molding machine includes a) causing said top and bottom mold portions to move apart from one another causing said molded product to release from said bottom mold portion and remain connected to said top mold portion, and b) causing said molded product to be released from said top mold portion, and wherein an adhesive force between said upper mold portion and said molded portion is stronger than an adhesive force between said molded portion and said bottom mold portion when said top and bottom mold portions to move apart from one another thereby causing said molded portion to remain connected to said top mold portion when said bottom mold portion when said top and bottom mold portions move apart from one another.

* * * * *